United States Patent
Behnisch et al.

(10) Patent No.: US 10,669,200 B2
(45) Date of Patent: Jun. 2, 2020

(54) METHOD AND DEVICE FOR PRODUCING ARTIFICIAL BROKEN SAND OR CRUSHED SAND BY MEANS OF A THERMAL TREATMENT USING SAND IN THE FORM OF FINE SAND (FS/FSA) AND/OR ROUND SAND AS THE STARTING MATERIAL

(71) Applicant: Innovative Sand GmbH, Neusäß (DE)

(72) Inventors: Dennis Behnisch, Diedorf (DE); Jovan Ikic, Neusäß (DE)

(73) Assignee: BLACK RAMEL LIMITED, Valletta (MT)

( * ) Notice: Subject to any disclaimer, the term of this patent is extended or adjusted under 35 U.S.C. 154(b) by 460 days.

(21) Appl. No.: 15/310,203

(22) PCT Filed: May 9, 2015

(86) PCT No.: PCT/DE2015/000238
§ 371 (c)(1),
(2) Date: Nov. 10, 2016

(87) PCT Pub. No.: WO2015/172765
PCT Pub. Date: Nov. 19, 2015

(65) Prior Publication Data
US 2017/0152176 A1 Jun. 1, 2017

(30) Foreign Application Priority Data

May 10, 2014 (DE) .......................... 10 2014 006 942
Dec. 21, 2014 (DE) .......................... 10 2014 019 319

(51) Int. Cl.
*C04B 20/02* (2006.01)
*F24S 20/30* (2018.01)
(Continued)

(52) U.S. Cl.
CPC .............. *C04B 14/06* (2013.01); *B02C 23/00* (2013.01); *B02C 23/02* (2013.01); *C04B 14/068* (2013.01);
(Continued)

(58) Field of Classification Search
CPC ....... F24S 20/30; C04B 18/023; C04B 20/026
(Continued)

(56) References Cited

U.S. PATENT DOCUMENTS 4,761,203 A * 8/1988 Vinson ................... D21C 9/007
162/158
5,992,499 A * 11/1999 Tordoff ..................... B22C 5/08
164/5

(Continued)

FOREIGN PATENT DOCUMENTS

CN 1513782 a 7/2004
CN 1950192 A 4/2007
(Continued)

OTHER PUBLICATIONS

Gautam et al.; Use of Glass Wastes as Fine Aggregate in Concrete, J. Acad. Indus. Res. vol. 1(6), Nov. 2012, pp. 320-322.
(Continued)

*Primary Examiner* — Sean M Michalski
(74) *Attorney, Agent, or Firm* — Lathrop GPM LLP (57) ABSTRACT

The invention relates to a method for producing artificial crushed sand by means of a thermal treatment using sand in the form of fine sand (FS/FSa) and/or round sand as the starting material (1). The starting material (1) in variant A is heated to a melting temperature by bundling sun rays (13), and/or the starting material in variant B is heated to a melting temperature by using a conventional melting device which achieves its energy supply using converted or stored solar power, whereby each of a plurality of sand grains are
(Continued)

melted together into a three-dimensional intermediate product (2). The intermediate product (2) produced in this manner is cooled and finally comminuted to a particle size of less than 2 mm in a comminuting process. An end product (3) is produced which differs from the starting material (1) with respect to the shape and surface roughness. The method offers a long-term solution for meeting the demand for crushed sand and provides sand for the construction industry.

21 Claims, 4 Drawing Sheets

(51) Int. Cl.
    *C04B 14/06*     (2006.01)
    *F24S 23/79*     (2018.01)
    *F24S 23/30*     (2018.01)
    *B02C 23/00*     (2006.01)
    *B02C 23/02*     (2006.01)
    *C04B 18/02*     (2006.01)

(52) U.S. Cl.
    CPC .......... *C04B 20/026* (2013.01); *F24S 20/30* (2018.05); *F24S 23/30* (2018.05); *F24S 23/79* (2018.05); *C04B 18/023* (2013.01); *F24S 23/31* (2018.05); *Y02E 10/40* (2013.01); *Y02P 80/24* (2015.11)

(58) Field of Classification Search
    USPC .................................. 241/99, 24.3; 126/681
    See application file for complete search history.

(56) References Cited

U.S. PATENT DOCUMENTS

| | | | | |
|---|---|---|---|---|
| 6,344,081 | B1* | 2/2002 | Pelot | C04B 14/22 106/697 |
| 6,691,765 | B2* | 2/2004 | Sparks | B22C 5/06 164/131 |
| 7,413,602 | B2* | 8/2008 | Grasso, Jr. | C04B 14/22 106/716 |
| 2006/0260514 | A1* | 11/2006 | Chang | C04B 18/16 106/745 |
| 2007/0199482 | A1* | 8/2007 | Kanai | B03B 9/063 106/638 |
| 2008/0308659 | A1* | 12/2008 | Grasso, Jr. | C04B 14/22 241/23 |
| 2009/0283018 | A1* | 11/2009 | Grasso, Jr. | B02C 17/22 106/709 |
| 2011/0232631 | A1* | 9/2011 | Bohmer | F28D 20/0056 126/606 |
| 2012/0037152 | A9* | 2/2012 | Nix | F24S 23/70 126/686 |
| 2014/0338658 | A1* | 11/2014 | Nix | F24S 23/71 126/681 |
| 2015/0167647 | A1* | 6/2015 | Gulen | F03G 6/06 60/641.11 |
| 2015/0291477 | A1* | 10/2015 | Bai | C04B 18/023 106/812 |

FOREIGN PATENT DOCUMENTS

| | | | |
|---|---|---|---|
| CN | 101691732 | A | 4/2010 |
| CN | 101987475 | A | 3/2011 |
| CN | 102877457 | A | 1/2013 |
| CN | 102877459 | A | 1/2013 |
| DE | 2032577 | A1 | 5/1971 |
| DE | 3248537 | C2 | 10/1986 |
| DE | 19516867 | A1 | 11/1996 |
| JP | S5826070 | A | 2/1983 |
| WO | WO 2010149177 | A2 | 12/2010 |

OTHER PUBLICATIONS

Translation of the International Search Report corresponding to International Application No. PCT/DE2015/000238, dated Nov. 9, 2015, 2 pages.
Translation of the International Preliminary Report on Patentability corresponding to Internaitonal Application No. PCT/DE2015/000238 dated Nov. 3, 2016, 4 pages.
Chinese Patent Application No. 201580024613.1 Office Action dated Jan. 29, 2019, with English translation, 19 pages.
Jüngling; Webwelt & Technik; Die lebensnotwendige Jagd nach mehr Sand, (The vital hunt for more sand) Apr. 23, 2014.
Kayser, M., Solar Sinter, Jun. 28, 2011, 2 pages.
Kayser, M,—Solar Sinter Project https://www.youtube.com/watch?v=ptUj8JRAYu8, Jun. 27, 2011, 1 page.
Kayser Works, Solar Sinter, https://kayserworks.com/#/798817030644 (undated), 8 pages.
Netz Konstrukteur "Solar Sinter—3D Druck mit der Kraft der Sonne" ("Solar Sinter—3D printing with the power of the sun"), Nov. 28, 2014, 13 pages.
Etherington, The Solar Sinter by Markus Kayser, 28 Jun. 2011, 23 pages.
Haydn Jones, "Solar Sand Converter—Solving the sand problem" Apr. 11, 2015, 10 pages.
Google, Search results for "desert sand solar melting" May 2015, 2 pages.
Haydn Jones "Measuring Extreme Temperatures" Apr. 30, 2015, 7 pages.
Bansal, N. et al., "Properties of Desert Sand and CMAS Glass" NASA STI program, Aug. 1, 2014, 20 pages.
NASA, Excerpt from NASA Technical Reports Server, found Oct. 8, 2019, 1 page.
Forum 3D Center, "Bald kein Sand mehr fur Beton?", found Oct. 8, 2019, 5 pages.
European Patent Application No. 15747087.3 Notice of Opposition dated Oct. 14, 2019, 164 pages.

\* cited by examiner

METHOD AND DEVICE FOR PRODUCING ARTIFICIAL BROKEN SAND OR CRUSHED SAND BY MEANS OF A THERMAL TREATMENT USING SAND IN THE FORM OF FINE SAND (FS/FSA) AND/OR ROUND SAND AS THE STARTING MATERIAL

A method and a device for the production of artificial broken or crushed sand through thermal treatment with the use of sand in the form of fine sand (fS/FSa) and/or round sand as starting material.

DESCRIPTION

The invention relates to a method and a device for the production of artificial broken or crushed sand through thermal treatment with the use of sand in the form of fine sand (fS/FSa) and/or round sand as the starting material.

The designation of sand is used according to definition for all non-solidified rock sediments which are composed of individual mineral grains with a grain size from 0.063 up to 2 mm. According to DIN 4022, the various types of sand are distinguished on the basis of their grain size, surface and shape. Dependent on grain-size distribution, sand is allocated to the categories fine sand (fS/FSa), medium sand (mS/MSa) or coarse sand (gS/CSa). A further subdivision of sands is specified by the terms "round sands" and "sharp sands". Round sands comprise primarily rounded components. They are found primarily in desert regions and occur primarily within the grain-size range of the fine sands (fS/FSa). Sharp sands are again subdivided into the naturally occurring broken sands and the artificially produced broken sands, the so-called crushed sands. Natural broken sands are obtained mainly through the pumping of marine beds and riverbeds.

The enormously large and constantly growing demand for concrete is also causing a marked increase in the demand for sand. Concrete accordingly comprises approximately 70% rock granulation and the remaining 30% water and cement. The rock granulation in the concrete, also designated as aggregates, is composed of pebbles and sand within the grain-size range from 0.025 to 16 or 32 mm—dependent upon particle-size distribution curve. On average, these aggregates comprise approximately 30% fine-grained content, that is, grains smaller than 2 mm. Concrete is therefore made from approximately 21% sand. The fine-grained contents of the concrete vary with its area of use: the already mentioned particle-size distribution curve of the concrete provides information about the precise composition of the aggregates. The person skilled in the art refers to the fine-grained contents of the rock granulation as the so-called "broken grain". The use of broken sands as fine-grained aggregates is of central importance for the strength of the concrete, because only these grains allow a mutual blocking, according to which the concrete is supported internally.

It is known that, in principle, the mineralogical composition of desert sand and coastal sand differs primarily in two points. While the average coastal sand grain is generally allocated to the range from medium sand (mS/MSa) to coarse sand (gS/CSa) and at the same time comprises a sharp-edged shape and rough surface, desert sand grains are generally mineral grains of the category of fine sand (fS/FSa) with primarily rounded geometry and smooth surface. The named differences in the mineral grains of coastal sand and desert sand can be explained simply through the significantly more severe weathering of the desert sand grains, which are worn away through continuous drifting and rolling movements, so that they become steadily smaller, rounder and smoother.

Furthermore, it is known that these apparently insubstantial differences present primarily the construction industry with major problems, because the desert sand is not suitable for the banking up new land in the sea because of the unfavourable grain properties and also not as a fine-grained aggregate in the production of concrete and cement (compare DELESTRAC, D. (Director) (2013). Sand—*Die neue Umweltzeitbombe* [*The New Environmental Timebomb*]. [Documentation]. France: ARTE). Hitherto, at most, small proportions of the fine-grained aggregates are substituted with desert sand—the straightforward use of desert sand in place of coastal sand is technically impossible.

Since the sources of naturally occurring broken sand on land have been largely depleted, and at the same time, the sand in the vast deserts—which continue to expand even further—is not suitable for the production of concrete, this leaves only the pumping of sand from the seabed. In this context, the vegetation is severely damaged. At the same time, the risk of natural catastrophes is increased, which represents a risk primarily to coastal inhabitants. Moreover, the salt-containing marine sand must be cleaned in an effort-intensive manner before use as an aggregate for the production of concrete, because an excessively high salt content enormously accelerates corrosion (primarily in steel reinforced concrete).

An environmentally friendly and mass-producible method for the production of crushed sand is to be developed in order to cover the lack of natural broken sands and to halt the continuing stresses on coastal regions.

The following methods are used in the prior art to cover the rapidly increasing lack of broken or crushed sand, especially sharp medium sand (mS/MSa). At present, attempts are being made to halt the excavation of coastal sand and marine sand using legal steps, so that the prices for sand are tending to increase and, at the same time, illegal excavation trading is becoming more prominent. One major sector is the production of crushed sand, that is, artificially broken sand through comminution of pebbles and shingle in very large breaking machines. In fact, this method does serve for the artificial production of broken sand (crushed sand), however, in this context, relatively large rock sediments must be broken up for this purpose, so that this process is promoting the expansion of deserts. At the same time, the price of crushed sand is significantly higher than the price of naturally broken sand (coastal sand), because an enormous energy requirement must be applied for the expensive, high-performance comminution machines. By contrast, the recycling of waste glass represents a significantly more effective approach, because, through the comminution and breakdown of waste glass, artificially broken sand can be manufactured, which is suitable, inter alia, for the production of concrete. However, for logistical reasons, this method is not capable of achieving the required sand volumes, which are required worldwide for concrete production. Furthermore, research teams are increasingly seeking methods to accelerate the natural weathering process. Such approaches include the shooting of rock fragments with high voltage flashes in order to achieve the end product of sand (JUNGLING, T. (2014). *Die lebensnotwendige Jagd nach mehr Sand* [*The Vital Hunt for More Sand*] [online]. Available at: http://www.weltde/wirtschaft/webwelt/article127216019/Die-lebensnotwendige-Jagd-nach-mehr-Sand.html [01.05.2014]). If anything this method provides only a medium-term solution, because it also accelerates the expansion of deserts. One day, a lack of rock for shooting will be brought about in this manner—precisely as in the case of the production of crushed sand from pebbles and shingle. The considerable quantities of energy required for the production of the high voltage flashes completely preclude this method. The last important research area is in construction chemistry, primarily in the search for synthetic substitutes for sand and appropriate binding agents. By varying the cement paste, researchers are trying to open up the potential of desert sand or find other synthetic substances for the production of concrete.

None of the named methods offers a mass-producible, environmentally friendly solution which covers the demand for sand. Accordingly, none of the methods engages with the problem at the point in which it is now described in the present invention. A method must be developed in order to make the enormous volume of sand in the deserts available both for the production of concrete and also for use in the recovery of new land.

Starting from this prior art, a method and a device for the production of artificially broken or respectively crushed sand through thermal treatment with the use of sand in the form of fine sand (fS/FSa) and/or round sand as the starting material and correspondingly produced broken or crushed sand with the features of the independent claims are proposed. In this context, desert sand—which is also designated as fine sand (fS/FSa) and round sand because of its named properties—is initially melted to form an intermediate product, the resulting conglomerate is then broken up again so that broken sand or respectively crushed sand, especially sharp medium sand (mS/MSa) is obtained as the end product.

A method is known from DE 3248537 C2, in which sintered moulded bodies, which comprise a low-density and at the same time high-strength, are produced from quartz sand. According to the method, quartz sand is initially filled into given moulds. In one preferred embodiment, these moulds are embodied as electrically conducting, so that, within the moulds, a high-voltage electrical field can be applied, which must be maintained until the sintering process. Through the action of the electrical field, the individual sand grains in the sintering mould take up a given spatial arrangement with relatively high porosity. This high porosity is subsequently decisive for the low-density of the sintered moulded body. In the final sintering process, the quartz sand is sintered within the mould, at temperatures significantly below the melting point. In DE 19516867 A1, the parameters of the method from DE 3248537 C2 for the production of low-density sintered moulded bodies are again revised and some incorrect assumptions have been corrected. Accordingly, the temperature range of the sintering process is not disposed at the originally assumed 1400-1650° C., but significantly lower at around 1250-1350° C. The composition of the starting material has also been defined more precisely and limited to compositions between 50-75% $SiO_2$ with 50-25% $Al_2O_3$. The sintered moulded bodies obtained in this manner can be used in a versatile manner as tiles, floor tiles, roof tiles, bricks and as other building materials, however, they do not offer a substitute for the fine-grained aggregates in concrete. Even with the comminution of these sintered moulded bodies to fragments of smaller than 2 mm—which is not targeted in either of the two patent specifications—the desired sharp medium sand (mS/MSa) would not be obtained. The reason for this is to be found in the sintering process, because temperatures up to 1600° C. (maximum value from DE 3248537 C2) are significantly below the melting point of sand (1713° C.). The sand grains do not melt completely but are bonded only through the softening of their surfaces. This is referred to as baking together. This baking together means that no new grain boundaries are formed. In the case of the subsequent comminution, the desired "broken grain" would therefore never be obtained, but only the starting product again, because the conglomerate would break apart at its bonding points. A conversion of the desert sand does not take place here, especially at the named temperatures. The melting of the sand and the production of new grain boundaries is not targeted in any of the patent specifications and must even be absolutely avoided with regard to a successful end product, namely sintered moulded bodies of low density and high-strength. The melting of the individual grains and therefore the production of new grain boundaries would destroy the cavities which are directly correlated with the low-density and would therefore lead to an end product of high-density, because the porosity produced with great effort by the electrical field would not be maintained. Further disadvantages are the indispensable use of (effort-intensive graphite) moulds, of which the filling and emptying processes represent a discontinuous handling step in the otherwise automatable process. This process is less suitable or even unsuitable for mass production with the quantities required for sand. Finally, through the production and maintenance of a high-voltage electrical field, the operation of continuous tunnel furnaces and the generally effort-intensive design and production of the moulds, this method is a very cost-intensive and energy-intensive method. Sand which would be produced with such a method would therefore have no prospect of profitable distribution.

Another more economical method for sintering sand grains is also known from the prior art. In the "Solar Sinter Project" by Markus Kayser, sand is sintered by the action of solar power for the purpose of aesthetic creation (compare Kayser, M. (2011). Solar Sinter [online]. Available under: http://www.markuskayser.com/work/solarsinter/ [01.05.2014]). In this context, solar rays are bundled in a lens and focused onto a sand layer, so that three-dimensional structures can be created from the powdered base material in a manner comparable to the known 3-D printing method. This method represents a sub-process of the invention named in claim 1, with the basic difference that, in the invention according to claim 1, sintered moulded bodies are not produced but rather melted bodies. Sintered moulded bodies comprise the same disadvantages as were already described above with reference to DE 3248537 C2. Furthermore, the method in the Solar Sinter Project in no sense suggests the production of sharp medium sand (mS/MSa) or respectively crushed sand but is limited to the production of sintered moulded bodies, predominantly for aesthetic creation.

None of the named sintering methods offers a method for the conversion of desert sand, that is, round sand or respectively fine sand (fS/FSa) into sharp medium sand (mS/MSa).

The present invention provides a full substitute for the final resource, the naturally broken sand, and an economically realisable and, above all environmentally friendly method for the production of the synthetic substitute material. This substitute material, referred to below as broken sand or respectively crushed sand, in particular as sharp medium sand (mS/MSa), represents a good alternative to the use of coastal and marine sand, the naturally crushed sand, primarily in the field of concrete production, and as a banking material for new land recovery.

By preference, the initially round, smooth mineral grains of the fine sand (fS/FSa) (desert sand) change their aggregation condition through the melting process and, in the liquid phase, enter a common bonding, so that the formation of grain boundaries occurs. In the comminution of these mineral grain conglomerates into fragments smaller than 2 mm, sand is obtained of which the mineral grains comprise a geometry and surface quality clearly distinguishable from the starting material. Advantageous comminution machines can be, for example, a shredder, a conical mill or a rotary impact crusher, such as are known from the recycling of refuse and waste glass. The mineral grain conglomerate, a three-dimensional structure, breaks down arbitrarily, thereby forming fragments with a sharp-edged geometry. This sharp and angular shape subsequently allows the mutual blocking of the grains in the building material (concrete and banking material for new land recovery). The second important property, the increased surface roughness is realised through the thermal forming process. The solidification of the three-dimensional sand grain congolmerate after the melting process is comparable with known processes of forming. In the case of forming of granulates into metals, it has been determined that the surface property after solidification from the melt does not generally meet the high requirements (in technology: smooth surfaces). The latter must be reprocessed, almost without exception, in grinding processes. In the invention, this principle is present in the inverted sequence. Through the natural grinding processes, the starting material comprises a surface too smooth for use in concrete. This surface property has been produced by constant mutual abrasion of the sand grains, which is attributable to drifting and the resulting rolling movements. With the thermal forming of the starting material, its surface is impaired. In other words, the surface roughness is increased. However, here, this occurs to the advantage of the requirements. The increased roughness prevents the sliding of individual grains against one another and therefore similarly contributes to the stabilisation of the building material.

The basic substitution of conventional coastal and marine sand with crushed sand according to the named production method is therefore guaranteed.

Advantages of the method described are grounded initially in the extremely environmentally friendly course of the process which can draw entirely on renewable energies. Accordingly, in one variant of the invention, not even photovoltaic collectors, that is, expensive semiconductor technology, are required. The direct location of the starting-product sand in the regions of maximum solar radiation ensures advantages in transport and storage of the starting material and the high level of technical efficiency of the process. With this invention, the enormous volume of sand occurring in desert regions can be opened up for the building sector and the recovery of new land, and in this context, marine vegetation can be spared. The increased risk of natural catastrophes in coastal regions, caused by the pumping away of sand, can therefore be dramatically reduced. At the same time, the increasing expansion of the deserts is slowed down.

Advantageously, the starting material is heated at least to the extent that new grain boundaries are formed. In particular, a breaking down back to the starting product during the comminution process can be avoided and precluded. It has been shown that under normal environmental conditions (pressure=1 bar, temperature=23° C.), a temperature of at least 1700° C. is sufficient to produce the necessary three-dimensional structure and to ensure that new grain boundaries have been formed. However, in some experiments, the desired result was also obtained only at temperatures significantly above the melting point, from approximately 1810° C. The methods of producing the melting temperature through bundling of solar rays achieve very high temperatures, beyond 2000° C. and, besides, cannot be adjusted exactly. The adjustment of the desired melting temperature is therefore only relevant with the use of conventional melting devices and should be determined precisely in a preliminary series of experiments dependent upon the precise composition of the sand and taking into consideration the environmental parameters. At this point, it should be mentioned that the subsequent strength of the concrete or of the banked-up new land depends heavily on the content of the crushed grain used in the sand. Of course, a sand mixture of "broken" and "un-unbroken" grain is conceivable, but it should be avoided in the production process through the correct melting temperature.

According to an advantageous embodiment of the method, the three-dimensional structure is cooled after the melting process until brittle cracks occur in the comminution process. It has been shown that the structure should preferably be cooled down to at least 600° C. in order to comprise a brittle behaviour. An expedient evaluation of this brittle behaviour can be made with the use of the scratch-hardness scale (Mohs scale of hardness). Under normal conditions, quartz, the principal constituent of the starting material, comprises a scratch-hardness of 7. From a value of 6, it is possible that plastic deformation does not occur before the material breaks. Accordingly, it is advantageous to cool the intermediate product until a scratch-hardness of 6 or higher is reached. The switch of the aggregation condition from liquid (melt) to solid (vitreous, three-dimensional structure) does not occur abruptly but passes through several phases. At temperatures higher than 1600° C., the structure ranges from liquid to semiliquid. Up to a temperature of 1200° C., it has a pulpy consistency which would lead to the congestion of some comminution machines. Between 600° C. and 1200° C., the structure is apparently solid, but the result is not necessarily successful during comminution. Successful results have been achieved predominantly with cooling to below 600° C. To be safe, complete cooling down to environmental temperature is advisable.

According to a preferred embodiment, the melting temperature is generated through the bundling of solar rays by means of at least one converging lens and/or at least one mirror. Both systems follow a similar principle, according to which solar rays are captured and bundled. The maximum temperatures are reached at the focal point, that is, the intersection point of the bundled solar rays. Both with a converging lens and also with the mirror or respectively mirrors, temperatures of more than 2000° C. can be generated without difficulty at this focal point.

In a preferred embodiment, the mirror or respectively the mirrors are constituted as at least one parabolic mirror or respectively as an arrangement of at least two mirrors with different angles of inclination in order to concentrate the solar light onto a common point or respectively intersection region. The use of many smaller mirrors, for example, 100 mirrors with an area of 0.4 m$^2$, is advantageous in order to concentrate powers of above 1000 W per square metre onto the processing area for the thermal treatment of the starting material. The sum of the differently inclined mirrors is designated by the person skilled in the art as a concentrator.

A further development of the invention is the use of reflecting flat mirrors, which are orientated, in particular, automatically, according to the position of the sun and, in this manner image, the light onto the mirror or respectively mirrors and/or the converging lenses. This increases the efficiency of the system, because the actual burning device need not be constituted to be movable in order to follow the position of the sun. In consequence, the focal point also does not wander along the processing area, so that the high temperature can be produced in a targeted manner at a fixed point. The person skilled in the art designates these flat mirrors as heliostat fields. The combination of heliostat fields and parabolic mirrors is used, for example, in the solar melting furnace "Centre du Four Solaire Félix Trombe" near Odeillo in France.

According to an advantageous further development, the starting material is initially heated to a pre-heating temperature, either in variant C through the bundling of solar rays and/or as shown in variant D through the use of a conventional heating device which obtains its energy supply via converted or stored solar power, wherein the pre-heating temperature is disposed below the melting temperature, and the heating to the pre-heating temperature is implemented with spatial separation from the heating to the melting temperature. By heating the starting material to a pre-heating temperature, for example, 1000° C., before the actual melting process, the duration of the process with a constant mass of the starting material can be approximately halved. It is therefore advantageous to heat the starting material in a first thermal treatment either via a tunnel furnace or a device for the bundling of solar rays. In this context, in a final variant, it is advisable to position the starting material above the focal point, because, in this manner, a larger effect per area can be achieved, and the maximal power of the collector attainable at the focal point is generally not required during the pre-heating. The use of concentrating mirrors may be more meaningful than the use of converging lenses because of the improved distribution and possibilities for overlapping of the active regions. Active regions are understood as regions preferably above the focal point in the direction towards the device for the bundling of the solar rays. The nearer the actual active region is to the proximity of the device for the bundling, the larger the active area will be and the smaller the power per unit area.

This embodiment is optimised with regard to mass production and energy efficiency, and according to initial assessment, represents the most economical of the named alternatives. It is proposed that the starting material is melted to form thin plates.

According to one preferred embodiment, the melting temperature is produced in a conventional manner through the use of a laser and/or a tunnel furnace, with the restriction that these melting devices should draw their energy from photovoltaic fields. One possible embodiment accordingly comprises at least one photovoltaic field, so that the energy for the conventional melting device is obtained from solar power. The system operates completely autonomously and does not rely on other energy sources. The restriction to the combination of conventional melting equipment and photovoltaic fields is made for two reasons. On the one hand, it is technically meaningful to station the device in the desert, because the starting material is stored there, and a very large solar radiation is present. Furthermore, the energy requirement of the unit is covered in this manner with cost-favourable solar power, so that the crushed sand produced can also be sold at a more favourable price. The solar power converted with the use of the photovoltaic systems can meaningfully be kept in different intermediate stores until the actual requirement by the consumers. In addition to, for example, electrical batteries, such intermediate stores can also be mechanical fly-wheels and hydraulic and pneumatic stores.

A further advantageous development is that the starting material is layered on a support surface, in particular a conveyor belt, melted onto the latter, cooled and transferred directly to the comminution process for the production of the fragments. The conveyor belt is advantageous for the mass production of the sharp medium sand (mS/MSa) or respectively crushed sand, because a continuous process is guaranteed in this manner. The cooling track can also be realised by the conveyor belt by adapting the speed and/or the length of the conveyor belt accordingly in order to observe the cooling time between melting process and comminution process. Active cooling devices, for example, a fan or an electrical cooling system, which can lead to an acceleration of the process, are also conceivable, however, these are associated with a high energy consumption as a consequence and are not absolutely necessary. The optimal length and speed of the conveyor belt should be determined in each case through experiments, because these depend primarily on external temperature and the melting temperature actually achieved. At this point, it should be mentioned that the energy provision for operating the conveyor belt can also be provided via photovoltaic fields.

As a result of the very high melting temperatures, the support surface is subjected to severe thermal stresses, for which reason special, heat-resistant coatings (e.g. ceramic alloys) can be used. By preference, the starting material is layered to a sufficient height so that it melts only in an upper region, e.g. three quarters, two thirds or one half, and, in this manner, at the same time, a lower region corresponding to one quarter, one third or one half, represents an insulation layer between support surface and the melted, three-dimensional structure. An adhesion of the three-dimensional structure on the support surface after the melting process is also avoided in a similar manner. The subdivision should, in general, be selected only in such a manner that an initial melting onto the support surface is prevented and, at the same time, the smallest possible insulation layer is produced, because this must be removed again. The insulation layer, which generally represents a region of sintered or partially melted sand grains, is expediently separated from the conglomerate plate before the comminution process, for example, through a riddling or brief grinding process, in order to avoid reducing the purity of the end product.

It is meaningful to use a riddle device before the melting device, on the one hand, to remove coarse foreign particles from the starting material and, furthermore, to allow a limitation of the grain-size range. It has been shown that a limitation of the grain-size range produces a more homogenous structure and guarantees a minimal acceleration of the melting process. However, since this time saving is not significant, the main aspect of the riddling process is in to remove foreign particles such as coarse grit or organic residues from the starting material.

It is proposed that the conveyor belt is started directly during the riddling process, guided through the melting device and allowed to run up to the comminution process. In this manner, the method is completely automated and guarantees a fast production rate.

Furthermore, equipping the conveyor belt with a stripper blade and/or a vibrating belt is recommended, because with these components, a thin, uniform sand layer can be achieved, which can be further finely adjusted in its layer height, in particular, with an adjustable stripper blade. The adjustment of the layer height is advantageous primarily for the production of the insulation layer described.

After the comminution process, the sand is conveyed, for example, into corresponding collecting containers and can then be prepared for transport or storage.

The use of the method described with an autonomous unit in the form of a desert vehicle, for example, a caterpillar vehicle, which comprises a melting device named in the invention, which focuses the solar light, for example, through a central cut-out in the vehicle onto the sand layer disposed under the vehicle, is also according tot he invention. The central melting device could be realised in the form of a tower superstructure and is ideally constituted to pivot around 360°. By means of a movable heliostat field, every possible position of the sun can be captured and reflected to the movable melting device. Alternatively, a movably constituted device for the bundling of solar rays, for example, an inclinable and pivoted Fresnel lens can be used. In this manner, the melted intermediate products, which are brought for comminution, for example, by means of a rake, into the rear part of the vehicle or into another vehicle, for example, travelling behind, are formed directly under the vehicle. Sand grains are again formed, of which the shape and surface roughness has been improved or respectively made possible to allow their use in concrete. The sharp sand suitable for concrete can either be collected directly in the vehicle or ejected elsewhere and collected separately.

As a result of the constant weathering of mountainous regions, buildings and all other rock sediments, which ultimately break down to form the finest dust particles (Sahara dust), the expansion of the deserts is a natural process and currently unavoidable. In future, a permanent reinforcement of desert fringes (in the proximity of civilisation) is guaranteed in a cost favourable manner with our method through the use of autonomous machines.

The invention is now described on the basis of exemplary embodiments and the attached schematic drawings.

Figure 1:
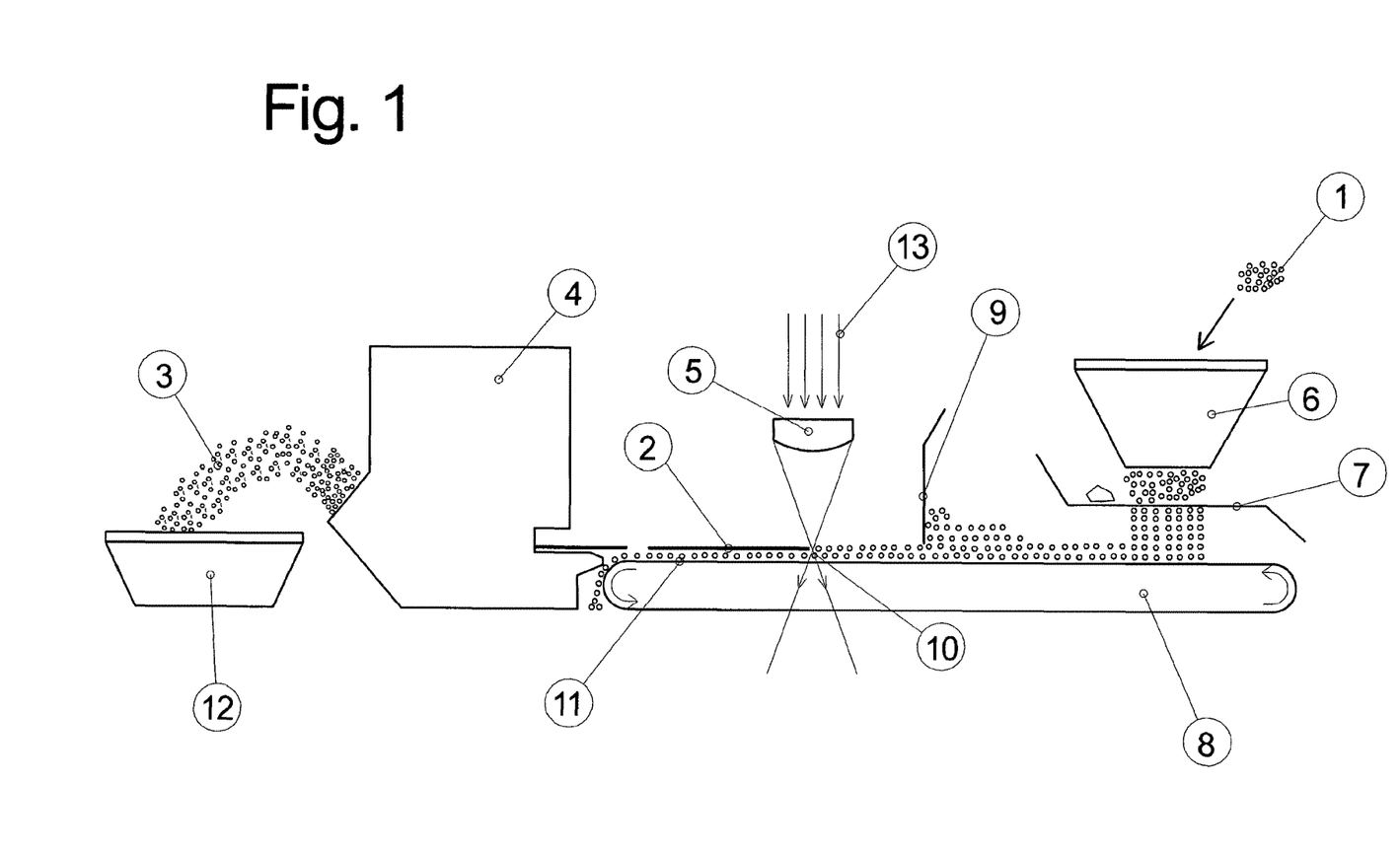
FIG. 1 a first preferred embodiment of a device according to the invention for the production of sand suitable for concrete.

The schematic FIG. 1 shows a possible unit for the implementation of a preferred embodiment of the method according to the invention. In this context, desert sand, as the starting material 1, is placed via a storage container 6 (e.g. hopper-shaped) onto a riddle 7, so that the coarsest impurities are removed from the starting material 1. After the riddling process, the riddled starting material 1 passes directly onto an appropriate conveyor belt 8 as the support surface. This conveyor belt is provided with a stripper blade 9 so that a uniform layer with a controllable layer thickness is produced. Optionally, the flatness of the substance layer can be improved by means of a vibrating belt. The uniform sand layer passes further via the conveyor belt 8 to the level of the thermal treatment, in that it is guided through the immediate proximity of the focal point 10 of a device 5 for bundling of solar rays (e.g. flat-convex converging lens), so that the starting material 1 melts. The larger the area of the device 5 for the bundling of solar rays is, the more sunlight 13 is captured and focused onto the focal point 10, and accordingly, the greater is the power of the unit. By preference, the entire layered starting material 1 does not melt in the thermal treatment, but only an upper region, for example, the upper two thirds, in order to obtain an insulation layer 11 relative to the support surface, the conveyor belt 8, in the lowest third. An advantageous layer thickness is disposed between 5 and 50 mm, dependent upon the power of the unit. The necessary acting time for the thermal melting can be regulated via the speed of the conveyor belt 8, so that a conglomerate plate 2 is formed in an uninterrupted melting process as the intermediate product. This conglomerate plate possesses, for example, the dimensions 500×500×20 mm (L×B×H) and, after sufficient cooling on the conveyor belt 8, passes directly into a comminution machine 4, for example, a shredder, wherein the conglomerate plate 2 is comminuted to form the end product 3, the broken sand or respectively crushed sand, in particular, sharp medium sand (mS/MSa). The end product 3 is captured and stored in an appropriate container 12 for transportation.

Figure 2:
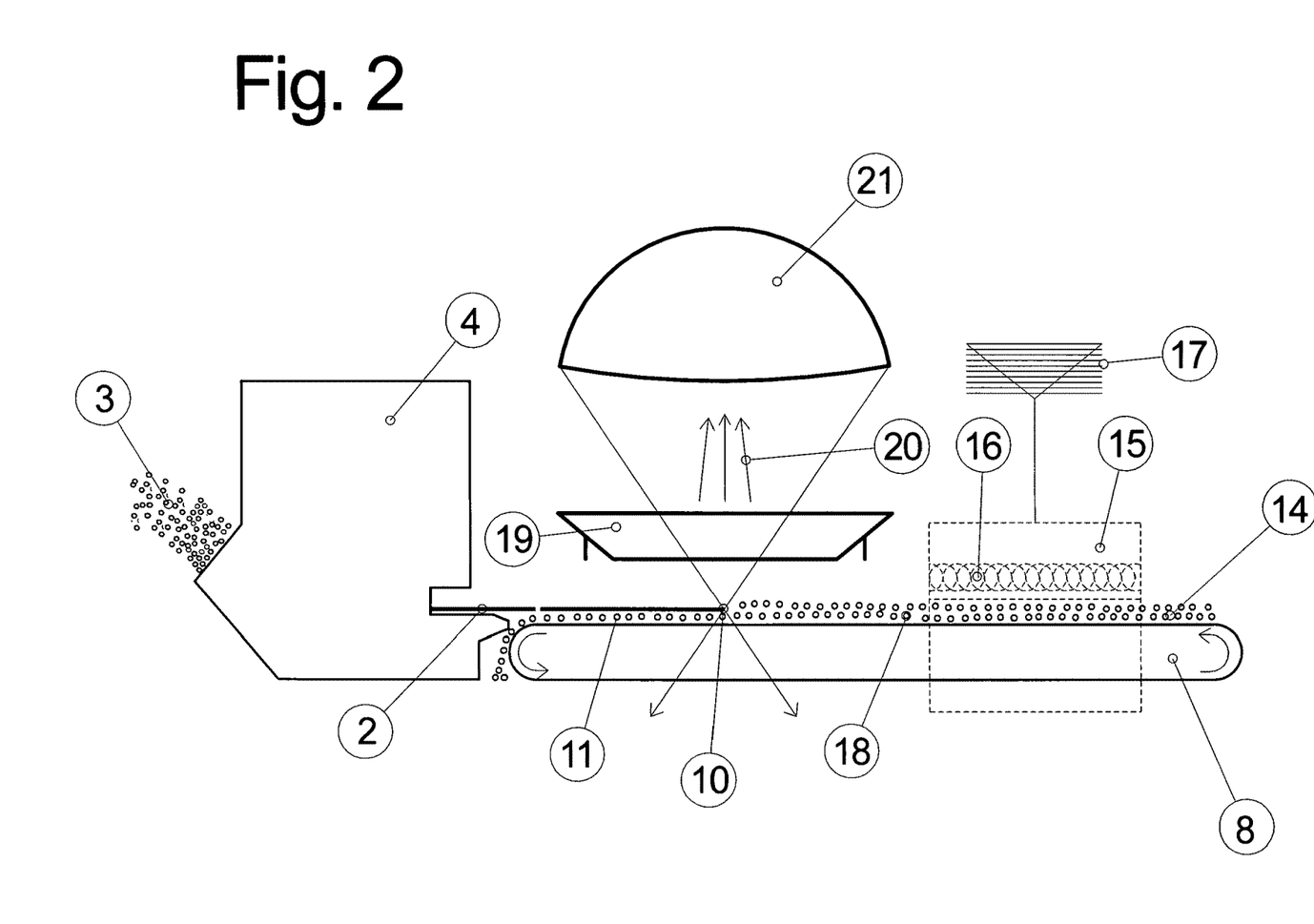
FIG. 2 a second preferred embodiment of a device according to the invention for the production of sand suitable for concrete.

FIG. 2 shows a further preferred embodiment of a device according to the invention. By analogy with FIG. 1, the already riddled, leveled and layered starting material 14 passes at this point via the conveyor belt 8 into a tunnel furnace 15, which is operated, for example, at around 1000° C., wherein heat sources 16 are mounted, preferably above the support surface, the conveyor belt 8. Accordingly, the prepared starting material 14 is guided through, under the heat sources 16. It is therefore possible to heat the prepared starting material 14 to a pre-heating temperature, e.g. 1000° C., so that the process as a whole can be accelerated. The tunnel furnace 15 is supplied with the necessary energy via photovoltaic fields 17, so that no further current sources are necessary here. The pre-heated starting material 18 then passes to the melting device, preferably a parabolic mirror 21 for the concentration of reflected solar light 20. This light is reflected from one or more flat mirrors 19 to the concentrator, the parabolic mirror 21. The flat mirror or respectively mirrors 19 are constituted in such a manner that they can be orientated, preferably automatically, according to the position of the sun. The pre-heated starting material 18 melts at the focal point 10 of the concentrator 21, wherein it is advantageous to produce an insulation layer 11 relative to the support surface, the conveyor belt 8, using the lower third of the layered substance 18. Following this, the melted intermediate product 2 is passed to a comminution machine 4, wherein the conglomerate plate is comminuted to form the end product 3, the broken sand or respectively crushed sand, in particular, sharp medium sand (mS/MSa). The crushed sand 3 produced with this method can be used both for the banking up of new land in the sea and also for the production of concrete, because it is mutually blocking because of its now sharp geometry and therefore ensures the necessary stabilisation in the building material.

Figure 3:
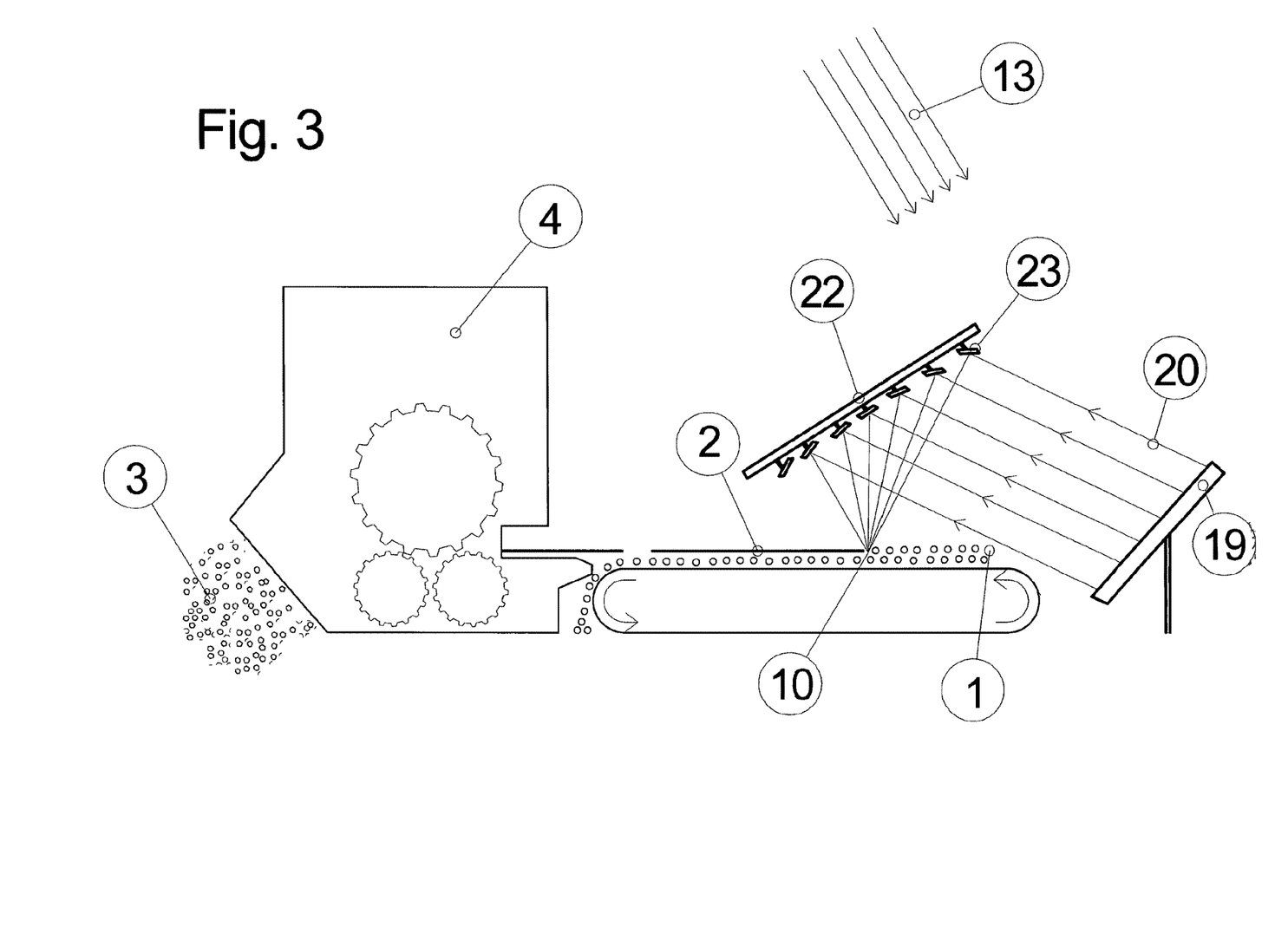
FIG. 3 a third preferred embodiment of a device according to the invention for the production of sand suitable for concrete.

FIG. 3 shows a method in which the starting material 1, for example, fine sand (fS/FSa) or respectively round sand, preferably desert sand, is initially caused to melt so that new grain boundaries are formed. The resulting three-dimensional structure as intermediate product 2 is then cooled and broken down in a comminution machine 4 into fragments smaller than 2 mm. The resulting sand grains of the end product 3 correspond in particular to the category of medium sand (mS/MSa) and are designated as broken sand or respectively crushed sand. As shown in this schematic drawing, the high melting temperatures can be reached through the bundling of solar rays in a concentrator 22, e.g. an arrangement of mirrors. In one preferred embodiment, the individual mirrors 23 are constituted with different inclination, so that the reflected solar light 20 is focused onto an active region 10. For this purpose, the solar light 13 is preferably imaged onto the concentrator 22 via a flat mirror 19, referred to by the person skilled in the art as a heliostat field. The method offers a long-term solution for covering the demand for broken sand and opens up the potential of desert sand for the building industry. The crushed sand (artificial broken sand) produced with this method can be used for the production of concrete and for the recovery of new land in the sea and accordingly spares the finite resources of naturally broken sand primarily from coastal regions, oceans and rivers.

Figure 4:
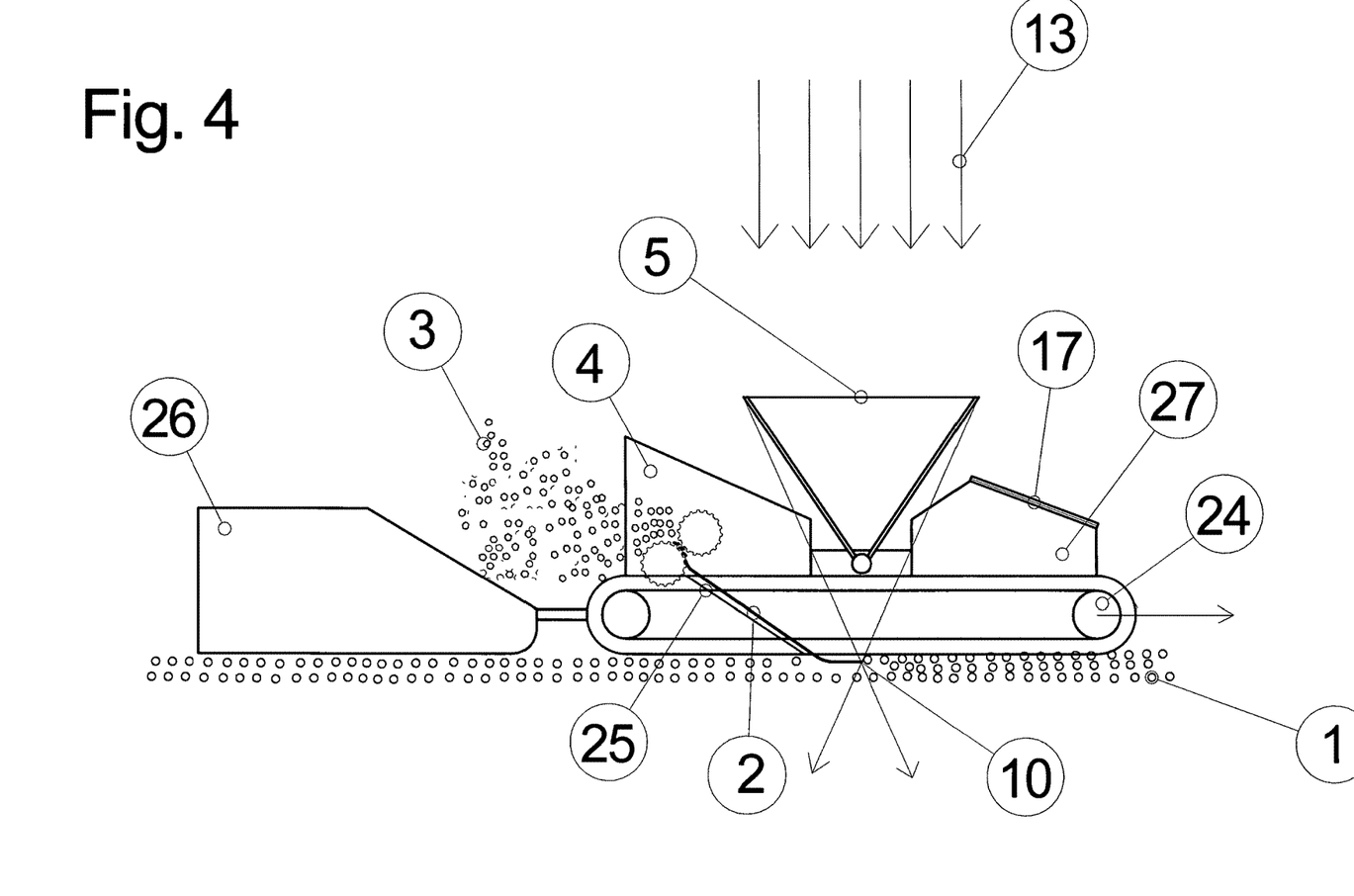
FIG. 4 a preferred embodiment of a vehicle according to the invention for the production of sand suitable for concrete.

The schematic FIG. 4 shows a possible vehicle for the implementation of a preferred embodiment of a method according to the invention. The vehicle constituted as a caterpillar vehicle 24 moves along over the starting material 1 under direct solar radiation 13. It is preferably controlled via a control panel 27 in the front region of the vehicle, or respectively via a sensor circuit which allows autonomous driving with reference to the under-ground and the position of the sun. The housing of the control panel 27 can advantageously be covered with photovoltaic fields 17, so that no further energy sources are required for the operation of the vehicle. Via a device 5 for the bundling of solar rays, e.g. a Fresnel lens, the necessary melting temperature is produced at the focal point 10, in order to transform the starting material 1 into the intermediate product 2, a conglomerate plate. For this purpose, the Fresnel lens 5 is mounted in a tower superstructure above the vehicle. At the same time, via a correspondingly broad shaft in the middle of the vehicle or respectively directly below the Fresnel lens 5, it is ensured that the bundled light is not interrupted down to the under-ground. In the rear part of the vehicle, the intermediate product 2 is separated from the under-ground via a rake 25 and deflected in the direction towards the comminution machine 4. By analogy with the embodiments described above, the final product 3, the broken sand, is produced there. The end product 3 can be collected by a collecting container 26, which is drawn along by the caterpillar vehicle 24 like a sledge, and placed into intermediate storage, for example, for further transportation.

LIST OF REFERENCE NUMBERS

1 Starting material (desert sand, fine sand, round sand)
2 Intermediate product (three-dimensional structure, conglomerate plate)
3 End product (broken sand, crushed sand, sharp medium sand (mS/MSa))
4 Comminution machine (e.g. shredder)
5 Device for bundling solar rays (e.g. converging or Fresnel lens)
6 Storage container (e.g. hopper)
7 Riddle
8 Conveyor belt
9 Stripper blade (e.g. height adjustable)
10 Focal point (or respectively active region)
11 Insulation layer (e.g. comprising starting material)
12 Collecting container (e.g. container)
13 Solar light
14 Layered starting material (riddled and leveled)
15 Tunnel furnace
16 Heat source (e.g. spiral heaters)
17 Photovoltaic fields (e.g. with direct current supply)
18 Pre-heated starting material (e.g. 1000° C.)
19 Flat mirror (e.g. heliostat field)
20 Reflected sunlight (from flat mirror to concentrator)
21 Parabolic mirror
22 Concentrator (e.g. arrangement of several mirrors)
23 Mirrors (e.g. all with different inclination)
24 Caterpillar vehicle
25 Rake
26 Collecting container (e.g. sledge)
27 Control panel (e.g. driver's cab)

The invention claimed is:

1. A method for producing artificial broken sand or crushed sand by means of thermal treatment using desert sand in the form of fine sand (fS/FSa) and/or round sand as the starting material (1), wherein the starting material (1) is heated
    A) through the capturing and focusing of solar rays, and/or
    B) through the use of a conventional melting device which achieves its energy supply using converted or stored solar power,
to a melting temperature,
whereby a plurality of sand grains is melted together in each case to form a three-dimensional intermediate product (2), wherein the resulting intermediate product (2) is cooled, and finally comminuted to a particle size of less than 2 mm, wherein an end product is produced which differs from the starting material (1) with respect to the shape and surface roughness.

2. The method according to claim 1, wherein the starting material (1) is heated up to or beyond the formation of new grain boundaries.

3. The method according to claim 1, wherein the intermediate product (2) is cooled down until it comprises a brittle behaviour in the comminution process.

4. The method according to claim 1, wherein the melting temperature in variant A is achieved through the capturing and focusing of solar rays by means of at least one converging lens (5) and/or at least one mirror.

5. The method according to claim 4, wherein at least one of the mirrors is constituted as a parabolic mirror (21), and/or an arrangement (22) of at least two mirrors with different angles of inclination (23) is used to concentrate the solar light onto a common focal point or respectively active region.

6. The method according to claim 4, wherein the efficiency of the converging lenses (5) and/or of the at least one mirror for the concentration of the solar light is improved through the use of reflecting mirrors (19), which are orientated according to the position of the sun and guide the solar light towards the converging lenses (5) or the at least one mirror for the concentration.

7. The method according to claim 1, wherein the melting temperature in variant B is achieved through the use of a tunnel furnace (15) and/or a laser which draws its energy supply from solar collectors (17).

8. The method according to claim 1, wherein the starting material (1) is initially heated
    C) through the capturing and focusing of solar rays and/or
    D) through the use of a conventional heating device, which obtains its energy supply via converted or stored solar power,
to a pre-heating temperature,
wherein the pre-heating temperature is disposed below the melting temperature, and the heating to the pre-heating temperature is implemented with spatial separation from the heating to the melting temperature.

9. The method according to claim 8, wherein the starting material (1) is melted only in an upper region, so that a lower region represents an insulation layer (11) between the intermediate product (2) and the support surface.

10. The method according to claim 1, wherein the starting material (1) is deposited on a support surface and melted to form the intermediate product (2).

11. The method according to claim 10, wherein the support surface is a conveyor belt (8) or a crucible.

12. The method according to claim 11, wherein the intermediate product (2) is supplied on a conveyor belt (8) directly to the comminution process for the production of the end product (3).

13. The method according to claim 10, wherein the support surface is a conveyor belt (8) and wherein the starting material (1) is placed onto the conveyor belt (8) as a thin layer with uniform layer thickness, by means of which it is guided at least directly to the position for the thermal treatment or through the latter, wherein the acting time of the thermal energy is controlled via the speed of the conveyor belt (8).

14. The method according to claim 13, wherein a processing surface of the conveyor belt (8), on which the starting material (1) is disposed and conveyed comprises a material or a coating resistant to melting up to at least 2000° C., which further guarantees an easy detachment of the thermally treated starting material (1).

15. The method according to claim 14, wherein, as the three-dimensional intermediate product (2), a flat intermediate product (2) is produced, in that either a) the focal point (10) of a lens (5) is focused on a processing area of the conveyor belt (8) on which the sand grains are disposed, and the sand grains are caused to melt in this manner through the introduction of solar power, so that a plurality of sand grains is melted thermally together in each case to form the flat intermediate product (2), and/or b) the starting material (1) is caused to melt via a laser, which obtains its energy supply using converted and/or stored solar power.

16. The method according to claim 15, wherein the intermediate product (2) is then cooled to below 500° C. and finally comminuted in one or more steps in a comminution process to a grain size between 0.0125 and 2.0 mm, wherein the end product (3) is produced.

17. The method according to claim 1, wherein impurities are first removed from the starting material (1) before the thermal treatment via an appropriate riddle (7), and/or the grain size range of the starting material (1) is accordingly limited for the further processing.

18. An artificial broken or crushed sand obtained through a method according to claim 1.

19. A device for the production of artificial broken or crushed sand using thermal treatment with the use of desert sand in the form of fine sand (fS/FSa) and/or round sand as the starting material (1), with a melting device for heating the starting material to melting temperature, wherein the melting device comprises a device for the capturing and focusing of solar rays or a tunnel furnace (15) and/or a laser, which draw their energy supply from solar collectors (17), with a cooling track disposed downstream of the melting device with a comminution machine (4) disposed downstream of the cooling track.

20. The device according to claim 19, wherein the cooling track comprises an active cooling device.

21. The device according to claim 19, which is constituted as a vehicle.

* * * * *